United States Patent
Signore et al.

(10) Patent No.: US 9,140,232 B2
(45) Date of Patent: Sep. 22, 2015

(54) METHOD FOR REPAIRING A PITCH SYSTEM IN A WIND TURBINE

(71) Applicant: General Electric Company, Schenectady, NY (US)

(72) Inventors: Jonathan Paul Signore, Latham, NY (US); Kristina Anne Gerber, Charleston, SC (US)

(73) Assignee: General Electric Company, Schenectady, NY (US)

( * ) Notice: Subject to any disclaimer, the term of this patent is extended or adjusted under 35 U.S.C. 154(b) by 146 days.

(21) Appl. No.: 13/937,244

(22) Filed: Jul. 9, 2013

(65) Prior Publication Data

US 2015/0013146 A1  Jan. 15, 2015

(51) Int. Cl.
| | |
|---|---|
| H02K 15/00 | (2006.01) |
| H02K 15/14 | (2006.01) |
| H02K 15/16 | (2006.01) |
| F03D 1/00 | (2006.01) |
| F03D 7/02 | (2006.01) |

(52) U.S. Cl.
CPC .............. F03D 1/003 (2013.01); F03D 7/0224 (2013.01); *F05B 2230/60* (2013.01); *F05B 2260/79* (2013.01)

(58) Field of Classification Search
CPC ....... B66C 1/108; B66C 13/085; F01D 25/28; F03D 1/003; F03D 1/0658; F03D 7/0224; F03D 11/00; F03D 11/02; F03D 11/0008; F05B 2260/79; F05B 2260/98; F05B 2230/60; F16C 41/02; F16C 19/38; F16C 23/08; F16C 27/04; F16C 33/3818; F16C 33/60; Y10T 29/37; Y10T 29/49009; Y10T 29/4973; Y10T 49/7187
USPC .............. 29/402.01, 402.08, 592.1, 592, 596, 29/598, 889.1; 416/47, 104, 131, 155, 174
See application file for complete search history.

(56) References Cited

U.S. PATENT DOCUMENTS

| | | | |
|---|---|---|---|
| 7,331,761 B2 | 2/2008 | Hansen et al. | |
| 7,730,627 B2* | 6/2010 | Mashue et al. | 33/501.7 |
| 7,811,057 B2* | 10/2010 | Uphues | 416/1 |
| 7,944,079 B1* | 5/2011 | Signore et al. | 290/55 |
| 8,091,199 B2 | 1/2012 | Goodwin | |
| 8,500,400 B2* | 8/2013 | Signore et al. | 416/1 |
| 2007/0104577 A1 | 5/2007 | Hansen et al. | |
| 2008/0014088 A1 | 1/2008 | Rogall | |
| 2008/0159863 A1 | 7/2008 | Uphues | |
| 2008/0213095 A1 | 9/2008 | Bech et al. | |
| 2009/0022442 A1 | 1/2009 | Bech et al. | |
| 2013/0243599 A1* | 9/2013 | Pasquet | 416/147 |

* cited by examiner

*Primary Examiner* — Paul D Kim
(74) *Attorney, Agent, or Firm* — James W. Pemrick; Ernest G. Cusick; Frank A. Landgraff (57) ABSTRACT

A replacement motor mount for a pitch system of a wind turbine includes a bracket assembly configured for attachment to a first motor mount and a second supporting structure. The replacement motor mount is configured for mounting and securing a pitch motor having a geared drive end. The replacement motor mount is configured to displace the pitch motor from the first motor mount by a predetermined distance.

12 Claims, 5 Drawing Sheets

METHOD FOR REPAIRING A PITCH SYSTEM IN A WIND TURBINE

BACKGROUND OF THE INVENTION

This invention relates generally to wind turbines, and more specifically to a replacement motor mount for a pitch system and a method for installing the replacement motor mount.

Some known wind turbines have pitch control systems comprised of a bearing coupled between a blade and a hub with a pitch motor positioning the blade attached to the bearing. The bearing may include a row of teeth that engage a gear of the motor. The motor's gear turns or pitches the blade by interacting with the teeth on the pitch bearing. Over time some of the bearing's teeth can become damaged, worn or may break off. The portion of the ring gear adjacent to the pitch motor is one region that often experiences excessive wearing. Current known solutions to repair a pitch control component require the removal of the affected blade or the entire rotor. In either case, a large crane is required for removal, and cranes of this type are costly. In addition, the wind turbine is taken off-line until the repairs can be completed.

In some wind turbines, the blades are up to 60 meters in length, but may be designed to be up to 100 meters, so removal to change a damaged pitch control system can be costly and time consuming. Other known wind turbines are offshore, requiring extensive equipment to remove a blade and replace the pitch control system components. Wind turbine hub heights can be over 120 meters and in high winds, making it dangerous for workers to be on the wind turbine.

A malfunctioning pitch control system can also cause a blade to move out of a pitch setting such that the blades of the wind turbine asymmetrically load the hub and rotor shaft. If the rotor begins to move within the stator due to the asymmetric loading, there is a possibility of the rotor contacting the stator, for example, in direct drive application with the turbine rotor being attached directly to the generator. An electrical transient can occur if the rotor and stator contact, and the wind turbine may then have to be taken off-line.

BRIEF DESCRIPTION OF THE INVENTION

In one aspect of the present invention, a replacement motor mount for a pitch system of a wind turbine includes a bracket assembly configured for attachment to a first motor mount and a second supporting structure. The replacement motor mount is configured for mounting and securing a pitch motor having a geared drive end. The replacement motor mount is configured to displace the pitch motor from the first motor mount by a predetermined distance.

In another aspect of the present invention, a motor mount for a pitch system of a wind turbine includes a first motor mount configured to secure a pitch motor, and a replacement motor mount configured as an alternate location for the pitch motor. The replacement motor mount is configured to displace the pitch motor from a location of the first motor mount by a predetermined distance; and wherein the predetermined distance is chosen to avoid interaction between a geared drive end of the pitch motor and a damaged region of a pitch bearing.

In still another aspect of the present invention, a method for repairing a pitch system in a wind turbine is provided. The pitch system includes a pitch bearing, a pitch motor and a motor mount for the pitch motor. The method includes the steps of, installing a replacement motor mount for the pitch motor, locating the replacement motor mount to displace the pitch motor from the motor mount by a predetermined distance, and attaching the pitch motor to the replacement motor mount. The predetermined distance is chosen to reduce interaction between a geared drive end of the pitch motor and a damaged region of the pitch bearing.

DETAILED DESCRIPTION OF THE INVENTION

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of the wind into mechanical energy. As used herein, the term "wind generator" is intended to be representative of any wind turbine that generates electrical power from rotational energy generated from wind energy, and more specifically, converts mechanical energy converted from kinetic energy of wind to electrical power. As used herein, the term "windmill" is intended to be representative of any wind turbine that uses rotational energy generated from wind energy, and more specifically mechanical energy converted from kinetic energy of wind, for a predetermined purpose other than generating electrical power, such as, but not limited to, pumping a fluid and/or grinding a substance.

Figure 1:
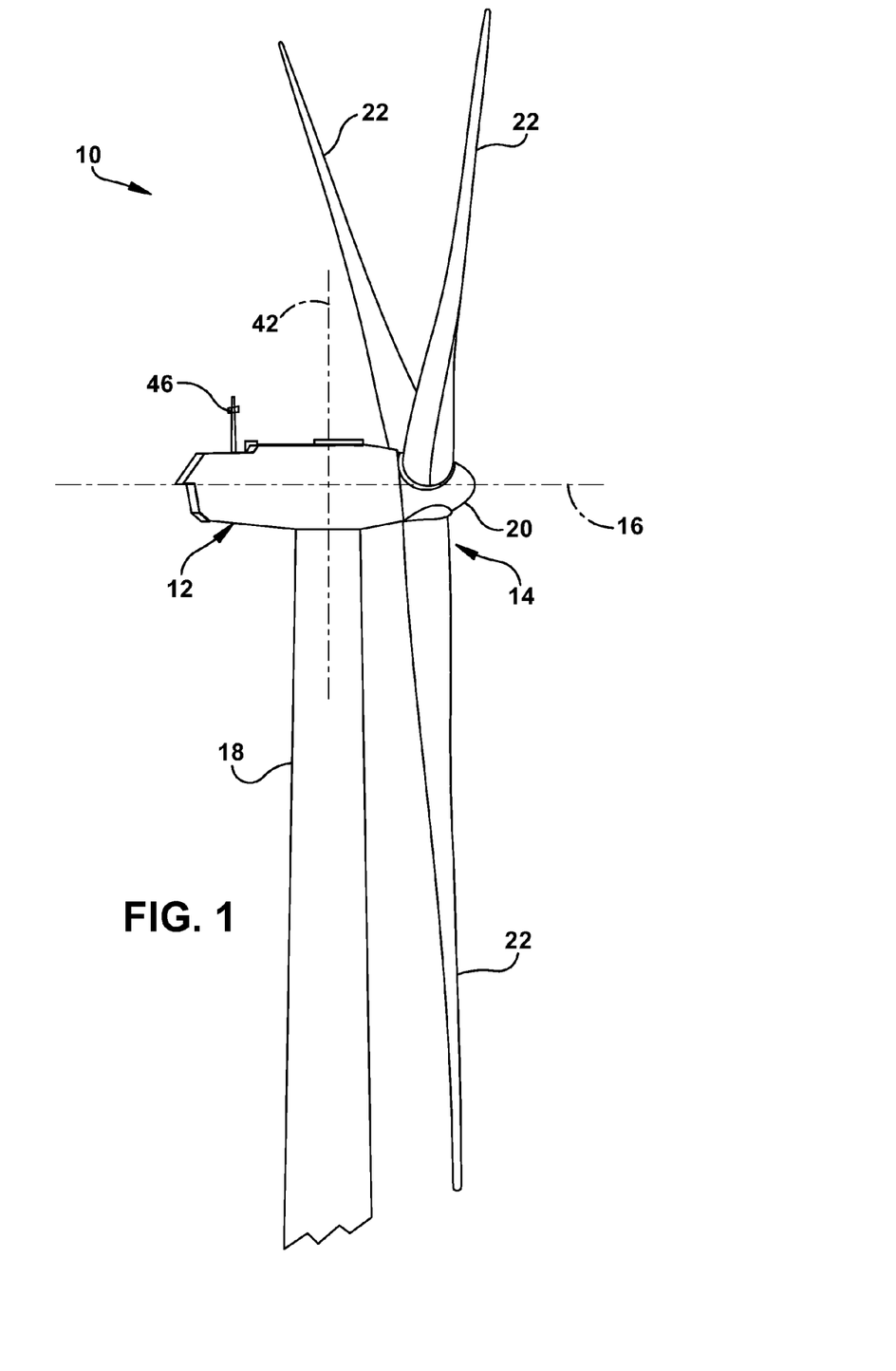
FIG. 1 is a perspective illustration of an exemplary wind turbine.

FIG. 1 is a perspective view of an exemplary embodiment of an exemplary wind turbine 10. Wind turbine 10 described and illustrated herein is a wind generator for generating electrical power from wind energy. In some known wind turbines, wind turbine 10 is any type of wind turbine, such as, but not limited to, a windmill (not shown). Moreover, wind turbine 10 described and illustrated herein includes a horizontal-axis configuration. In some known wind turbines, wind turbine 10 includes a vertical-axis configuration (not shown). Wind turbine 10 may be coupled to an electrical load (not shown), such as, but not limited to, a power grid (not shown), and may receive electrical power therefrom to drive operation of wind turbine 10 and/or its associated components and/or may supply electrical power generated by wind turbine 10. Although only one wind turbine 10 is shown in FIGS. 1-3, in some embodiments a plurality of wind turbines 10 are grouped together, to form a "wind farm".

Wind turbine 10 includes a nacelle 12, and a rotor (generally designated by 14) coupled to body 12 for rotation with respect to body 12 about an axis of rotation 16. In the exemplary embodiment, nacelle 12 is mounted on a tower 18. The height of tower 18 is any suitable height enabling wind turbine 10 to function as described herein. Rotor 14 includes a hub 20 and a plurality of blades 22 (sometimes referred to as "airfoils") extending radially outwardly from hub 20 for converting wind energy into rotational energy. Although rotor 14 is described and illustrated herein as having three blades 22, rotor 14 may include any number of blades 22.

Figure 2:
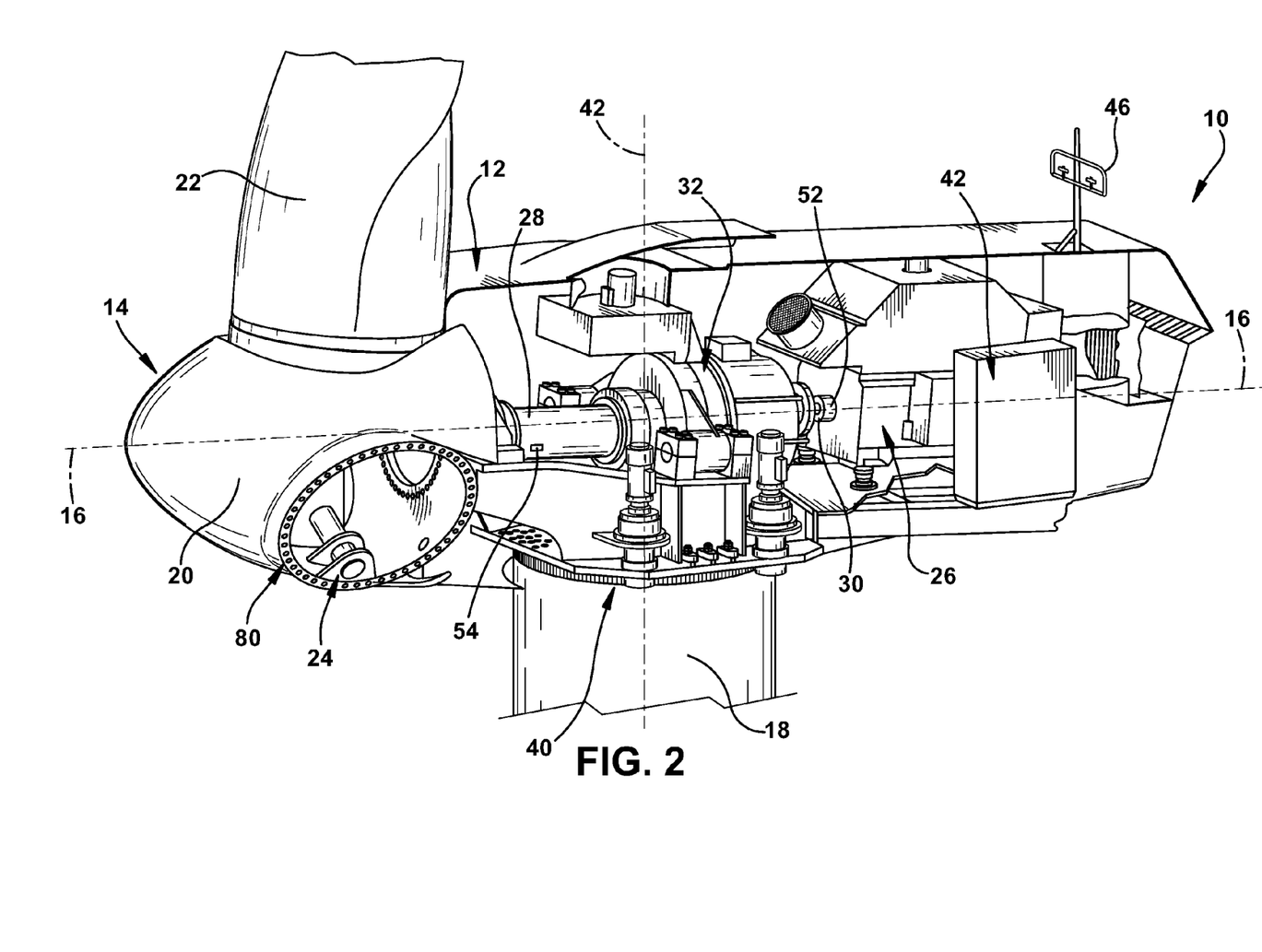
FIG. 2 is a partially cut-away perspective illustration of a portion of the wind turbine shown in FIG. 1.
Figure 3:
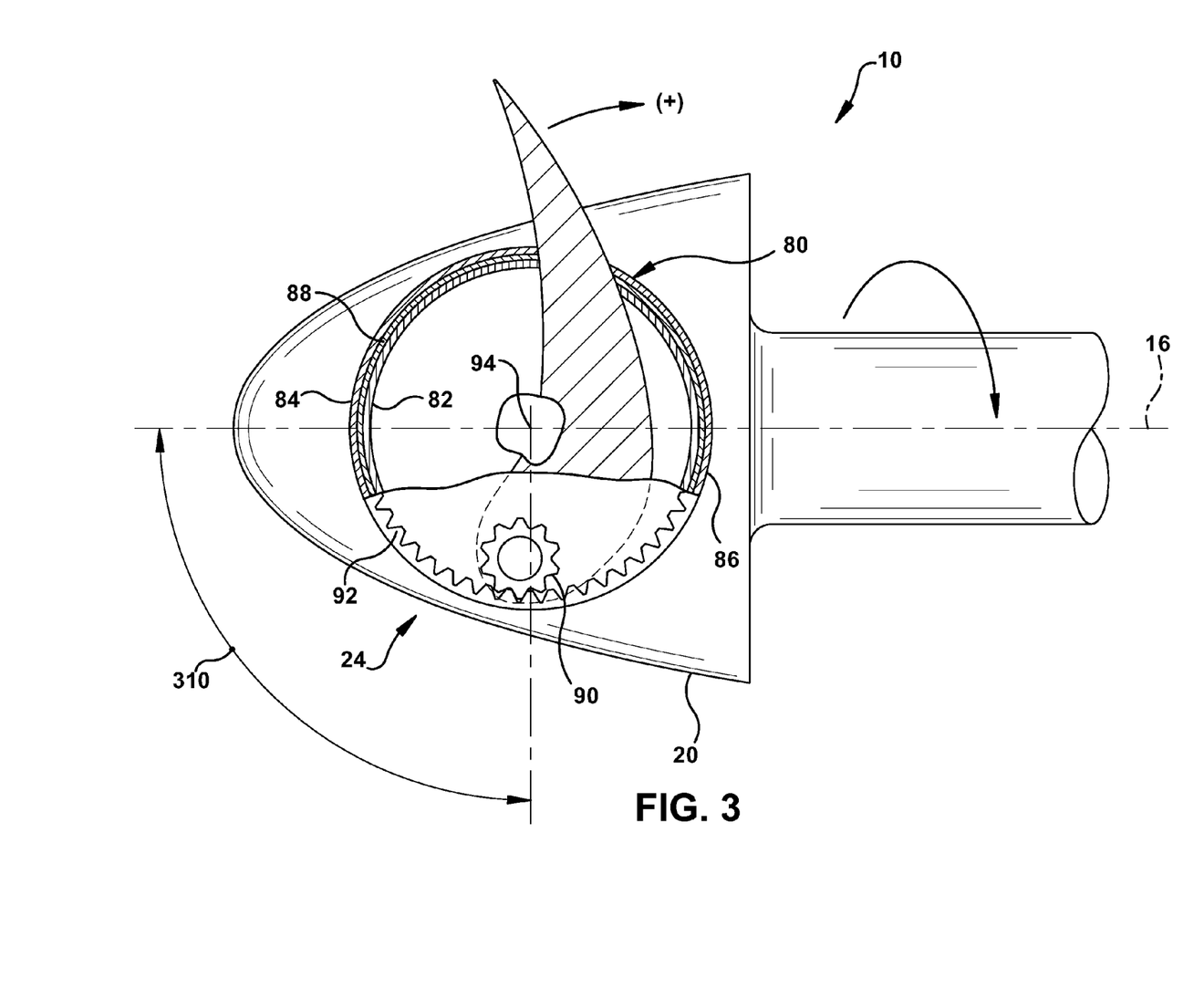
FIG. 3 is a cross-sectional view illustration of a portion of a rotor hub of the wind turbine shown in FIGS. 1-2 illustrating an exemplary embodiment of a pitch system.

FIG. 2 is a partially cut-away perspective view of a portion of the exemplary wind turbine 10. Wind turbine 10 includes an electrical generator 26 coupled to rotor 14 for generating electrical power from the rotational energy generated by rotor 14. Generator 26 is any suitable type of electrical generator, such as, but not limited to, a wound rotor induction or permanent magnet generator. Rotor 14 includes a low speed rotor shaft 28 coupled to rotor hub 20 for rotation therewith. Generator 26 is coupled to a high speed rotor shaft 30 such that rotation of rotor shaft 28 drives rotation of the generator rotor, and therefore operation of generator 26. In the exemplary embodiment, high speed rotor shaft 30 is coupled to low speed shaft 28 through a gearbox 32, although in other embodiments generator rotor shaft 30 is coupled directly to rotor shaft 28. The rotation of rotor 14 drives the generator rotor to thereby generate variable frequency AC electrical power from rotation of rotor 14.

In some embodiments, wind turbine 10 includes a brake system (not shown) for braking rotation of rotor 14. Furthermore, in some embodiments, wind turbine 10 includes a yaw system 40 for rotating nacelle 12 about an axis of rotation 42 to change a yaw of rotor 14. Yaw system 40 is coupled to and controlled by a control system(s) 44. In some embodiments, wind turbine 10 includes anemometry 46 for measuring wind speed and/or wind direction. Anemometry 46 is coupled to control system(s) 44 for sending measurements to control system(s) 44 for processing thereof. In the exemplary embodiment, control system(s) 44 is mounted within nacelle 12. Alternatively, one or more control systems 44 may be remote from nacelle 12 and/or other components of wind turbine 10. Control system(s) 44 may be used for, but is not limited to, overall system monitoring and control including, for example, pitch and speed regulation, high-speed shaft and yaw brake application, yaw and pump motor application, and/or fault monitoring. Alternative distributed or centralized control architectures may be used in some embodiments.

FIG. 3 is a cross-sectional view of a portion of hub 20 illustrating an exemplary embodiment of a pitch system 24. Wind turbine 10 includes variable blade pitch system 24 for controlling a pitch angle of rotor blades 22 with respect to a wind direction. Pitch system 24 is coupled to control system(s) 44 for control thereby. Blade 22 and pitch system 24 are coupled to pitch bearing 80 housed in hub 20. Pitch bearing 80 has an inner race 82 and a concentric outer race 84. Inner race 82 is coupled to blade 22 and outer race 84 is coupled to pitch system 24. An annular groove 86 is defined between inner race 82 and outer race 84 and includes at least one material 88 which reduces friction when inner race 82 and outer race 84 move with respect to each other. Material 88 is at least one of rollers or balls (not shown) or a lubricant or low-friction material (not shown). Alternatively, blade 22 is coupled to outer race 84, and inner race 82 is coupled to hub 20 wherein pitch system 24 drives outer race 84 to control the position of blade 22.

In some embodiments, pitch system 24 includes one or more actuators. The pitch actuators include any suitable structure, configuration, arrangement, means, and/or components, such as, but not limited to, electrical motors, hydraulic cylinders, springs, and/or servomechanisms. Moreover, the pitch actuators are driven by any suitable means, such as, but not limited to, hydraulic fluid, electrical power, electrochemical power, and/or mechanical power, such as, but not limited to, spring force. In some embodiments, the pitch actuators are driven by energy extracted from at least one of a rotational inertia of rotor 14 and a stored energy source (not shown) that supplies energy to components of wind turbine 10. In the exemplary embodiment, pitch system 24 includes a pitch drive gear 90 and a toothed pitch ring gear 92 coupled to hub 20 and blades 22 via bearing 80. Pitch system 24 utilizes actuators for changing the pitch angle of blades 22 by rotating blades 22 coupled to inner race 82 with respect to hub 20 and outer race 84. More specifically, in the exemplary embodiment, the pitch actuators include a pitch drive gear 90 that is coupled to a pitch ring gear 92. Pitch ring gear 92 is coupled to blade 22 such that rotation of pitch drive gear 90 rotates blade 22 about an axis of rotation 94 to thereby change the pitch of blade 22.

As described earlier, the teeth of pitch ring gear 92 can become damaged or worn, no longer providing the correct functionality. Known repairs for this issue involve replacing or turning the pitch bearing to engage the pitch drive pinion with undamaged gear teeth. To change the bearing, the blade and or rotor must be removed, resulting in a difficult and costly operation involving high capacity cranes with high reaches.

The method and system, according to aspects of the present invention, include providing a pitch drive mount that can be brought up into the hub and attached to the hub either using self-fixturing or separate tooling to drill and tap mounting holes in the hub, thus enabling a pitch drive to be applied to an undamaged section of the pitch ring gear teeth. Typically, only about one quadrant 310 of the pitch ring gear teeth are actually driven by the pitch drive gear 90, and often the damage is restricted to less than that, sometimes only one to a few teeth. The method of the present invention enables several repairs over the life of the turbine without having to drop the rotor or reposition the bearing.

Figure 4:
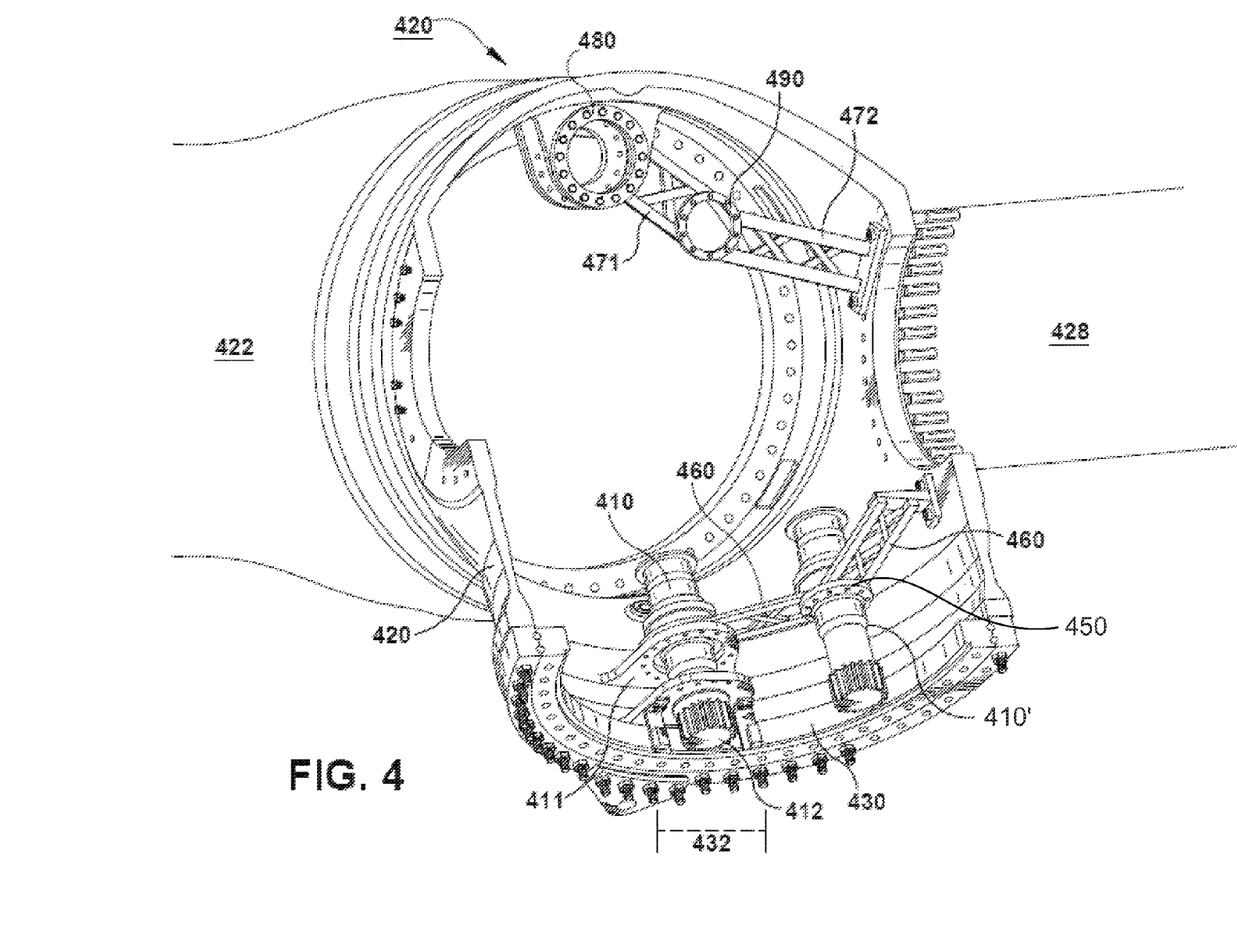
FIG. 4 illustrates a partial perspective view of a replacement motor mount, according to an aspect of the present invention.

FIG. 4 illustrates a partial perspective view of a replacement motor mount, according to an aspect of the present invention. The hub 420 is connected to the low speed shaft 428. The pitch motor 410 is mounted to a motor mount 411. Motor mount 411 may also be referred to as a first motor mount. The pitch motor 410 includes a geared drive end 412 that interacts with a geared portion of a pitch bearing gear 430. The pitch motor 410 may also be referred to as the pitch motor/drive assembly. As mentioned previously, one quadrant of the pitch bearing is driven by the pitch motor, and this quadrant can become excessively worn. Typically this wear is localized to a small region 432 of the pitch bearing, so if this region could be avoided then the wind turbine can continue to be used without requiring a total blade 422 or rotor removal.

When excessive wear occurs, a replacement motor mount 450 (or 490) may be installed a predetermined distance away from the previous motor mount 411. The replacement motor mount 450, 490 may also be referred to as a second motor mount. The predetermined distance is chosen to avoid or reduce interaction with the damaged region 432 of the pitch bearing gear 430. For example, the replacement motor mount 450 location could be spaced from the previous motor mount 411 by about 10 to about 25 degrees or more. This would effectively avoid the damaged region 432 during the starting and stopping phase of the pitch cycle, which is when the gear 430 experiences the most load from the drive end 412 of the pitch motor 410.

The motor mount 450 includes, or may be attached to, a bracket assembly 460 configured for mounting and securing the pitch motor 410' (or a replacement motor). The bracket assembly 460 is configured for attachment to a previous (or first) motor mount 411 and a second supporting structure (which could be a portion of the hub 420). The brackets, 460, 471 and 472 are configured to support and stabilize the respective replacement motor mounts 450, 490. For example, the bracket assembly 471, 472 may include a first bracket member 471 connected to the previous (or first) motor mount 480 and the replacement motor mount 490, and a second bracket member 472 connected to the motor mount 490 and the hub 420. The hub connection could be any suitable location, such as preexisting holes or new holes could be drilled for any required fasteners. The existing pitch motor 410 may be moved to the replacement motor mount 450, and the pitch motor mounted in replacement motor mount 450 is indicated by 410'.

Figure 5:
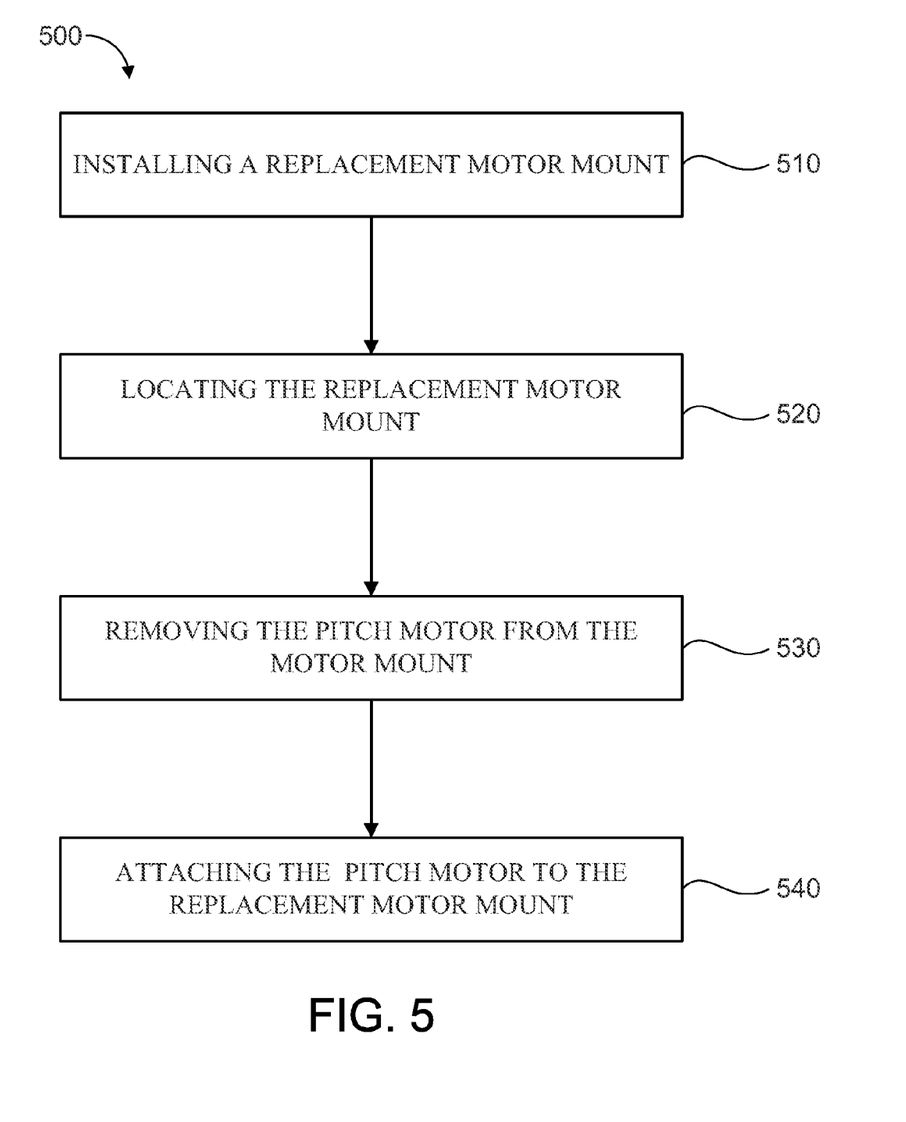
FIG. 5 illustrates a flow chart of a method for repairing a pitch system in a wind turbine, according to an aspect of the present invention.

FIG. 5 illustrates a flow chart of a method 500 for repairing a pitch system in a wind turbine. As described previously, the pitch system 24 includes a pitch bearing 80, a pitch motor 410 and a motor mount 411 for the pitch motor. The method includes a step 510 of installing a replacement motor mount 450 for the pitch motor 410. Step 520 locates the replacement motor mount 450 to displace the pitch motor 410 (410') from the motor mount 411 by a predetermined distance. The predetermined distance is chosen to reduce interaction between a geared drive end 412 of the pitch motor 410, 410' and a damaged region 432 of the pitch bearing. As one example only, the predetermined distance spaces the replacement motor mount 450 about 10 degrees to about 25 degrees or more away from the motor mount 411 (and damaged region 432). An optional step 530, removes the pitch motor 410 from the original motor mount 411. This step may be performed before the subsequent attaching step 540. The old motor 410 may be reused in the new location (410'), or a new pitch motor may be installed in the new location of replacement mount 450. In step 540, the pitch motor 410' is attached to the replacement motor mount 450 (or 490).

Additional steps may include connecting a first bracket member 460 (or 471) to the motor mount 410 (or 480) and the replacement motor mount 450 (or 490), and connecting a second bracket member 460 (or 472) to the replacement motor mount 450 (or 490) and the hub 420. Alternatively, the replacement motor mount 450, 490 may have the brackets 460 (or 471, 472) formed integrally with the bracket or the brackets may be pre-attached to the motor mount. In still other embodiments, the replacement motor mount 450, 490 may be installed on a new wind turbine as a ready, backup motor mount location. In this way, a technician only needs to move the pitch motor from the old location to the new location. It is envisioned that the replacement motor mounts 450 could be spaced at set intervals around the pitch bearing (e.g., every 10, 20, 30 or 45 degrees). Furthermore, the method 500 may be performed on the wind turbine in-situ, which provides the advantage of not requiring wind turbine rotor or blade removal. This in-situ method 500 provides substantially improved results that were unexpected, because the pitch system can now be repaired without having to remove a rotor blade 22 or the entire rotor 14. Wind turbines can now be repaired faster and more economically, and put back online more quickly so they may generate sustainable and environmentally friendly electrical power.

The motor mount is not limited to the specific embodiments described herein, but rather, components of the motor mount may be utilized independently and separately from other components described herein. For example, the motor mount and corresponding repair process may also be used with other control systems for controlling bearings (e.g., yaw), and is not limited to practice with only wind turbine blade assemblies as described herein. Rather, the present invention can be implemented and utilized in connection with many other pitch or yaw applications. The term "motor" will be understood to include one or more of the motor, drive assembly and/or gearbox.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for repairing a pitch system in a wind turbine, the pitch system including a pitch bearing, a pitch motor and a motor mount for the pitch motor, the method comprising the steps of:
    installing a replacement motor mount for the pitch motor;
    locating the replacement motor mount to displace the pitch motor from the motor mount by a predetermined distance;
    attaching the pitch motor to the replacement motor mount; and
    wherein the predetermined distance is chosen to reduce interaction between a geared drive end of the pitch motor and a damaged region of the pitch bearing.

2. The method of claim 1, wherein the predetermined distance spaces the replacement motor mount about 110 degrees to about 25 degrees or more away from the motor mount.

3. The method of claim 1, the installing step further comprising:
    connecting a first bracket member to the motor mount and the replacement motor mount.

4. The method of claim 3, the installing step further comprising:
    connecting a second bracket member to the replacement motor mount and a hub.

5. The method of claim 1 wherein the installing, locating and attaching steps are all performed on the wind turbine in-situ.

6. The method of claim 5 wherein the installing, locating and attaching steps are all performed on the wind turbine without rotor or blade removal.

7. The method of claim 1, further comprising the step of:
    removing the pitch motor from the motor mount, wherein the removing step is performed before the attaching step.

8. A method for repairing a pitch system in a wind turbine, the pitch system including a pitch bearing, a pitch motor and a motor mount for the pitch motor, the method comprising the steps of:
    installing a replacement motor mount for the pitch motor;
    locating the replacement motor mount to displace the pitch motor from the motor mount by a predetermined distance;
    attaching the pitch motor to the replacement motor mount; and
    wherein the predetermined distance is chosen to avoid interaction between a geared drive end of the pitch motor and a damaged region of the pitch bearing, and the predetermined distance spaces the replacement motor mount about 10 degrees to about 25 degrees or more away from the motor mount.

9. The method of claim 8, the installing step further comprising:
 connecting a first bracket member to the motor mount and the replacement motor mount; and
 connecting a second bracket member to the replacement motor mount and a hub.

10. The method of claim 9, wherein the installing, locating and attaching steps are all performed on the wind turbine in-situ.

11. The method of claim 10, wherein the installing, locating and attaching steps are all performed on the wind turbine without rotor removal or blade removal.

12. The method of claim 11, further comprising the step of:
 removing the pitch motor from the motor mount, wherein the removing step is performed before the attaching step.

\* \* \* \* \*

UNITED STATES PATENT AND TRADEMARK OFFICE
CERTIFICATE OF CORRECTION

| | |
|---|---|
| PATENT NO. | : 9,140,232 B2 |
| APPLICATION NO. | : 13/937244 |
| DATED | : September 22, 2015 |
| INVENTOR(S) | : Signore et al. |

It is certified that error appears in the above-identified patent and that said Letters Patent is hereby corrected as shown below:

In the Claims

In Column 6, Line 33, in Claim 2, delete "110" and insert -- 10 --, therefor.

Signed and Sealed this
Twenty-first Day of June, 2016

Michelle K. Lee
*Director of the United States Patent and Trademark Office*